(12) United States Patent
Xu

(10) Patent No.: US 10,049,633 B2
(45) Date of Patent: Aug. 14, 2018

(54) ARRAY SUBSTRATE AND METHOD FOR DRIVING THE SAME

(71) Applicant: SHENZHEN CHINA STAR OPTOELECTRONICS TECHNOLOGY CO., LTD., Shenzhen (CN)

(72) Inventor: Xiangyang Xu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 152 days.

(21) Appl. No.: 14/416,827

(22) PCT Filed: Aug. 21, 2014

(86) PCT No.: PCT/CN2014/084917
§ 371 (c)(1),
(2) Date: May 20, 2016

(87) PCT Pub. No.: WO2016/023241
PCT Pub. Date: Feb. 18, 2016

(65) Prior Publication Data
US 2017/0110074 A1    Apr. 20, 2017

(30) Foreign Application Priority Data
Aug. 13, 2014   (CN) .......................... 2014 1 0397924

(51) Int. Cl.
*G09G 5/10*  (2006.01)
*G09G 3/36*  (2006.01)
(Continued)

(52) U.S. Cl.
CPC ......... *G09G 3/3659* (2013.01); *G02F 1/1368* (2013.01); *G02F 1/13624* (2013.01); *G02F 1/136286* (2013.01); *G02F 2201/123* (2013.01)

(58) Field of Classification Search
CPC ...... G09G 3/3659; G09G 3/36; G09G 3/3607; G09G 3/3655
See application file for complete search history.

(56) References Cited

U.S. PATENT DOCUMENTS 6,229,516 B1    5/2001   Kim et al.
6,512,505 B1 *  1/2003   Uchino ................ G09G 3/3614
                                                      345/96
(Continued)

FOREIGN PATENT DOCUMENTS

CN        1749835 A       3/2006
CN      101369075 A       2/2009
(Continued)

OTHER PUBLICATIONS

Office Action dated May 4, 2016, by the State Intellectual Property Office of the People's Republic of China, in corresponding Chinese Patent Application No. 201410397924.X. (6 pages).
(Continued)

*Primary Examiner* — Vijay Shankar
(74) *Attorney, Agent, or Firm* — Buchanan Ingersoll & Rooney PC

(57) ABSTRACT

An array substrate includes a plurality of scan lines formed on a substrate in parallel, a plurality of data lines, which are formed on the substrate in a direction perpendicular to the respective scan lines, but disposed in a different layer from the scan lines, a plurality of pixel units respectively disposed in areas formed by the scan lines and the data lines, each pixel unit including at least one pixel electrode and at least two TFT switches. A first TFT switch pre-charges the pixel electrode, and a second TFT switch pre-charges the pixel
(Continued)

electrode with gray scale voltage. A scan signal of at least one scan line enables the first TFT switches of the pixel units on in a line, and at the same time enables the second TFT switches of the pixel units on in another line. A method for driving the array substrate is also described.

8 Claims, 3 Drawing Sheets

(51) Int. Cl.
 *G02F 1/1368* (2006.01)
 *G02F 1/1362* (2006.01)

(56) References Cited

U.S. PATENT DOCUMENTS

| | | | | |
|---|---|---|---|---|
| 7,126,574 | B2* | 10/2006 | Uchino | G09G 3/3614 |
| | | | | 345/96 |
| 7,646,369 | B2* | 1/2010 | Kobashi | G09G 3/3614 |
| | | | | 345/100 |
| 7,889,160 | B2* | 2/2011 | Yoo | G09G 3/3233 |
| | | | | 345/204 |
| 2006/0061534 | A1 | 3/2006 | Lee | |
| 2007/0182685 | A1 | 8/2007 | Park et al. | |
| 2008/0001857 | A1* | 1/2008 | Yoo | G09G 3/3233 |
| | | | | 345/76 |
| 2009/0046216 | A1 | 2/2009 | Chen | |
| 2009/0096735 | A1 | 4/2009 | Meng | |
| 2009/0262059 | A1* | 10/2009 | Chung | G09G 3/3648 |
| | | | | 345/96 |
| 2011/0057924 | A1 | 3/2011 | Yanai | |
| 2012/0162562 | A1 | 6/2012 | Ono | |
| 2012/0182489 | A1* | 7/2012 | Wang | G02F 1/1368 |
| | | | | 349/38 |
| 2013/0127829 | A1 | 2/2013 | Hou et al. | |
| 2013/0093798 | A1* | 4/2013 | Kang | G09G 3/3648 |
| | | | | 345/690 |

FOREIGN PATENT DOCUMENTS

| | | |
|---|---|---|
| CN | 101408684 A | 4/2009 |
| CN | 101408702 A | 4/2009 |
| CN | 102024409 A | 4/2011 |
| CN | 102411241 A | 4/2012 |
| CN | 202217663 U | 5/2012 |
| CN | 103631023 A | 3/2014 |
| JP | H07-98461 A | 4/1995 |

OTHER PUBLICATIONS

Notification of Transmittal of the International Search Report (Form PCT/ISA/220 and Form PCT/ISA/210) and the Written Opinion of the International Searching Authority (Form PCT/ISA/237) dated May 15, 2015, by the State Intellectual Property Office of China in corresponding International Application No. PCT/CN2014/084917. (12 pages).

* cited by examiner

ARRAY SUBSTRATE AND METHOD FOR DRIVING THE SAME

CROSS REFERENCE TO RELATED APPLICATION

The present application claims benefit of Chinese patent application CN 201410397924.X, entitled "Array Substrate and Method for Driving the Same" and filed on Aug. 13, 2014, which is incorporated herein by reference.

TECHNICAL FIELD

The present disclosure relates to the technical field of display, and in particular, to an array substrate and a method for driving the array substrate.

TECHNICAL BACKGROUND

Due to the limitation of the manufacturing technology, impurities would mix in the liquid crystal molecules. The impurities will be ionized by the direct-current electric field and form polarization residual electric field. Under the action of the polarization residual electric field, even if no voltage is applied, the liquid crystal molecules would also deflect and develop certain light transmission effect. As a result, normal display of the liquid crystal panel is influenced.

In order to eliminate the polarization residual electric field caused by the direct-current electric field, the liquid crystal panel is usually driven by means of alternating current. However, such driving method would lead to reversal inversion of the signal, causing the charge needed for the pixel electrode to double. Therefore, the charging time would also double.

In order to improve the charging efficiency of the pixel electrode, Chinese patent CN202217663 discloses an array substrate and a display apparatus, which provide a charging method of connecting each pixel electrode with two TFTs. Although such a charging method can improve the charging efficiency of the pixel electrode, more scan lines are needed to drive the extra TFTs. Under such circumstances, more driving chips of the scan lines are needed, thereby increasing the cost of producing the array substrate.

For the above reasons, an array substrate and a corresponding method for driving the array substrate, which can maintain the charging efficiency of the pixel electrode and at the same time reduce the cost of producing the liquid crystal panel, are needed.

SUMMARY OF THE INVENTION

In order to solve the above problem, the present disclosure provides an array substrate and a corresponding method for driving the array substrate, which can maintain the charging efficiency of the pixel electrode and at the same time reduce the cost for producing the liquid crystal panel.

According to an aspect of the present disclosure, a liquid crystal display array substrate is provided, comprising:
a plurality of scan lines formed on a substrate in parallel,
a plurality of data lines, which are formed on the substrate in a direction perpendicular to the respective scan lines, but disposed in a different layer from the scan lines,
a plurality of pixel units respectively disposed in areas surrounded by the scan lines and the data lines, each pixel unit comprising at least one pixel electrode and at least two TFT switches, wherein a first TFT switch is used for pre-charging the pixel electrode, and a second TFT switch is used for charging the pixel electrode with gray scale voltage,
wherein a scan signal of at least one scan line enables the first TFT switches of the pixel units on in a line, and at the same time enables the second TFT switches of the pixel units on in another line.

According to an embodiment of the present disclosure, the pixel units in said another line are separated from the pixel units in said line by at least one line of pixel units.

According to an embodiment of the present disclosure, the pixel units in said another line are adjacent to the pixel units in said line.

According to an embodiment of the present disclosure, the scan lines further comprise two auxiliary scan lines respectively connected to the gates of the first TFT switches of the pixel units in the first two lines of the array substrate, so as to pre-charge the pixel units in these two lines.

According to an embodiment of the present disclosure, the scan lines further comprise an auxiliary scan line connected to the gates of the first TFT switches of the pixel units in the first line of the array substrate, so as to pre-charge the pixel units in the first line.

According to an embodiment of the present disclosure, the sources of the first and second TFT switches of the pixel units in each column are connected to the same data line.

According to an embodiment of the present disclosure, the sources of the first and second TFT switches of two adjacent pixel units in the same column are respectively connected to two adjacent data lines.

According to another aspect of the present disclosure a method for driving the array substrate is provided, comprising the following steps:
providing a sequence of scanning signals to the plurality of scan lines of the array substrate under the action of a drive pulse,
providing a gray scale voltage signal to the plurality of data lines of the array substrate, so as to pre-charge the corresponding pixel electrodes or charge said pixel electrodes with gray scale voltage through the first TFT switches or the second TFT switches thereof,
wherein the scan signal on at the least one scan line enables the first TFT switches of the pixel units on in a line, and at the same time enables the second TFT switches of the pixel units on in another line, so as to charge the pixel units in said line with gray scale voltage while pre-charging the pixel units in said another line.

According to an embodiment of the present disclosure, the scan lines further comprise two auxiliary scan lines, and when the scan signal of a first auxiliary scan line and that of a second auxiliary scan line respectively enable the first TFT switches of corresponding pixel units, common electrode voltage signal is provided to the plurality of data lines.

According to an embodiment of the present disclosure, the scan lines further comprise an auxiliary scan line, and when the scan signal of the auxiliary scan line enables the first TFT switches of corresponding pixel units, common electrode voltage signal is provided to the plurality of data lines.

The present disclosure has the following beneficial effects.

According to the present disclosure, a scan signal of a scan line enables the first TFT switches of the pixel units in a line, and at the same time enables the second TFT switches of the pixel units in another line. In this case, the number of scan lines needed for enabling the TFT switches on is reduced, and thus the chips for driving the scan lines can be reduced, thereby the cost of producing the array substrate can be reduced.

Other features and advantages of the present disclosure will be further explained in the following description and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

In order to clarify the technical solutions of the embodiments of the present disclosure or those in the prior art, the drawings relating to the embodiments or to the prior art will be explained briefly. In which.

DETAILED DESCRIPTION OF THE EMBODIMENTS

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

Figure 1:
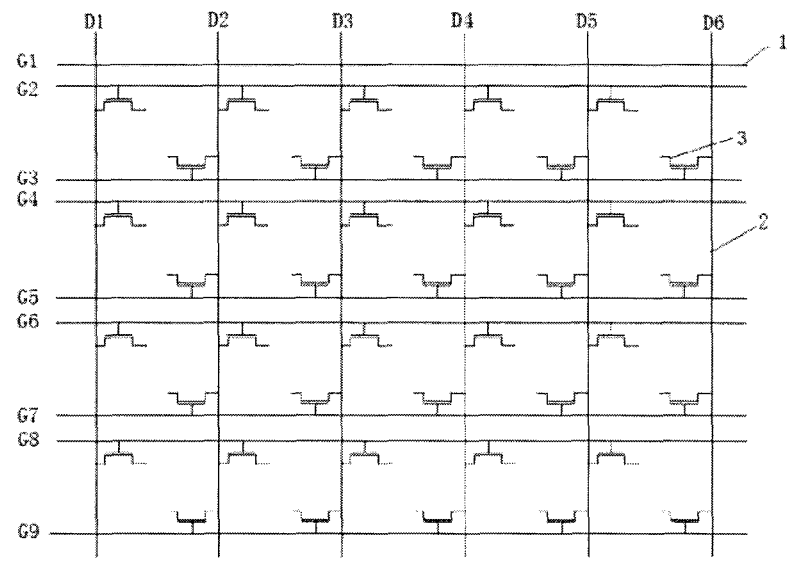
FIG. 1 schematically shows an existing array substrate which uses two TFTs to charge the same pixel electrode, FIG. 2 schematically shows an array substrate according to a first embodiment of the present disclosure.

FIG. 1 schematically shows an existing array substrate which uses two TFTs to charge the same pixel electrode. As shown in FIG. 1, the array substrate comprises a plurality of scan lines arranged in parallel and a plurality of data lines arranged in a direction perpendicular the scan lines, among which D1 to D6 are data lines and G1 to G7 are scan lines. Pixel units are disposed in areas formed by the scan lines and the data lines. Each pixel electrode in a pixel unit comprises two TFTs for charging, thereby improving the charging efficiency of the pixel electrode. The two TFTs of each pixel electrode are respectively controlled by different scan lines. Under the circumstances, the number of TFTs doubles, and so does the number of scan lines needed. As a result, the number of chips for driving the scan lines doubles, and thus the production cost of the array substrate is increased. Therefore, the present disclosure provides an array substrate which can reduce the production cost.

The array substrate according to the present disclosure comprises a plurality of scan lines formed on a substrate in parallel. The array substrate further comprises a plurality of data lines formed on the substrate in a direction perpendicular to the respective scan lines, but disposed in a different layer from the scan lines. Pixel units are disposed in areas formed by the scan lines and the data lines.

Each pixel unit comprises at least one pixel electrode. Each pixel electrode is charged by at least two TFT switches. When a pixel electrode is charged by two TFT switches, the two TFT switches are respectively a first TFT switch and a second TFT switch. The first TFT switch pre-charges the pixel electrode, and the second TFT switch charges the pixel electrode with gray scale voltage.

Under the action of a drive pulse, a scan signal of a scan line enables the second TFT switches of corresponding pixel units on, and at the same time enables the first TFT switches of the pixel units on in another line. In this case, the scan signal of one scan line simultaneously enables the TFT switches of pixel units on in two lines, and thus the number of scan lines needed is reduced, thereby the number of chips for driving the scan lines can be reduced.

Figure 2:
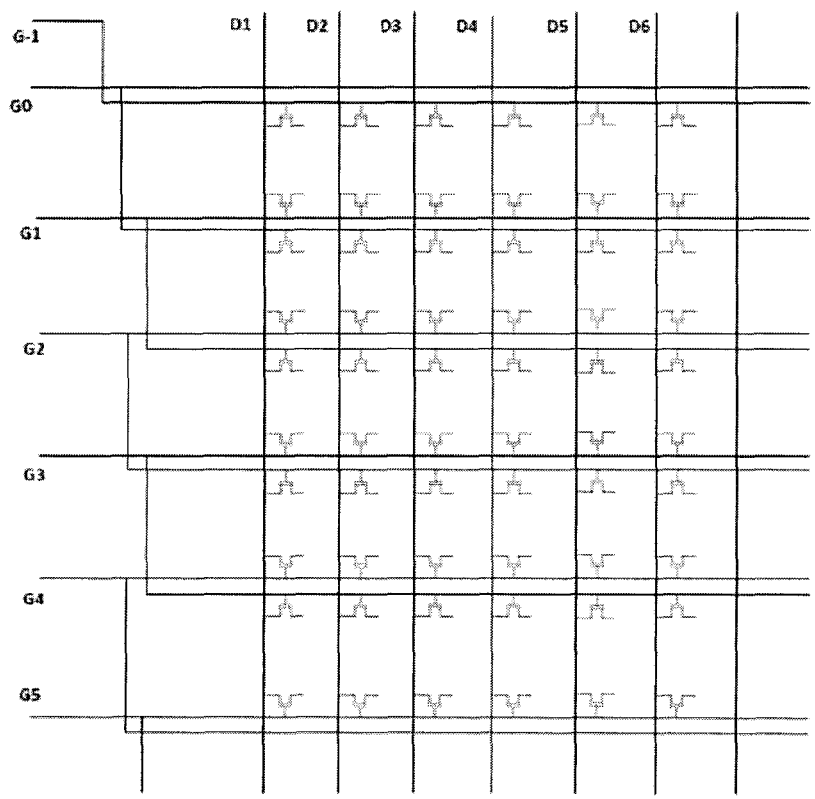

FIG. 2 schematically shows an array substrate according to example 1 of the present disclosure. As shown in FIG. 2, 3a indicates the first TFT switch and 3b indicates the second TFT switch. D1 to D7 are data lines and G-1 to G5 are scan lines. G-1 and G0 are auxiliary scan lines. The auxiliary scan line G-1 is connected to the gates of the first TFT switches of the pixel units in a first line of the array substrate, and the auxiliary scan line G0 is connected to the gates of the second TFT switches of pixel units in a second line of the array substrate. Under the action of a drive pulse, a scan signal of any one of G1 to G5 enables the second TFT switches of corresponding pixel units on. In the meantime, the scan signal of the scan line enables the first TFT switches of the pixel units on in a line that is spaced apart from said scan line by one line of pixel units through a branch line of said scan line.

In the array substrate, the sources of the first and second TFT switches of the pixel units in each column are connected to the same data line. In this case, the pixel units in the same column can be controlled by the same data line.

In order to illustrate the principle of the array substrate according to the present example more clearly, assume that a scan signal of scan line n enables the second TFT switches of pixel units on in the corresponding line n under the action of a drive pulse. When the scan signal enables the second TFT switches of the pixel units on in line n, the data line provides voltage signal to charge the corresponding pixel electrodes with gray scale voltage. In the meantime, the scan signal of the $n^{th}$ scan line enables the first TFT switches of pixel units corresponding to scan line (n+2) through a branch divided from scan line n, and the data line provides voltage signal to charge the corresponding pixel electrodes with gray scale voltage. At that time, the voltage provided by the data line is the gray scale voltage needed by the pixel electrodes of the pixel units in line n rather than that needed by the pixel electrodes of the pixel units in line (n+2). Therefore, the process of charging the pixel electrodes of the pixel units in line (n+2) is known as pre-charge. For the same reason, the first TFT switches corresponding to pixel units in line n are controlled by a scan signal of a branch divided from scan line (n−2).

As compared with FIG. 1 in which the TFTs of pixel units in one line are controlled by the scan signal of one scan line, in the method for controlling the array substrate according to the present example, the number of scan lines is reduced, and thus the number of chips for driving the scan lines can be reduced, thereby the production cost of the array substrate can be reduced.

Figure 3:
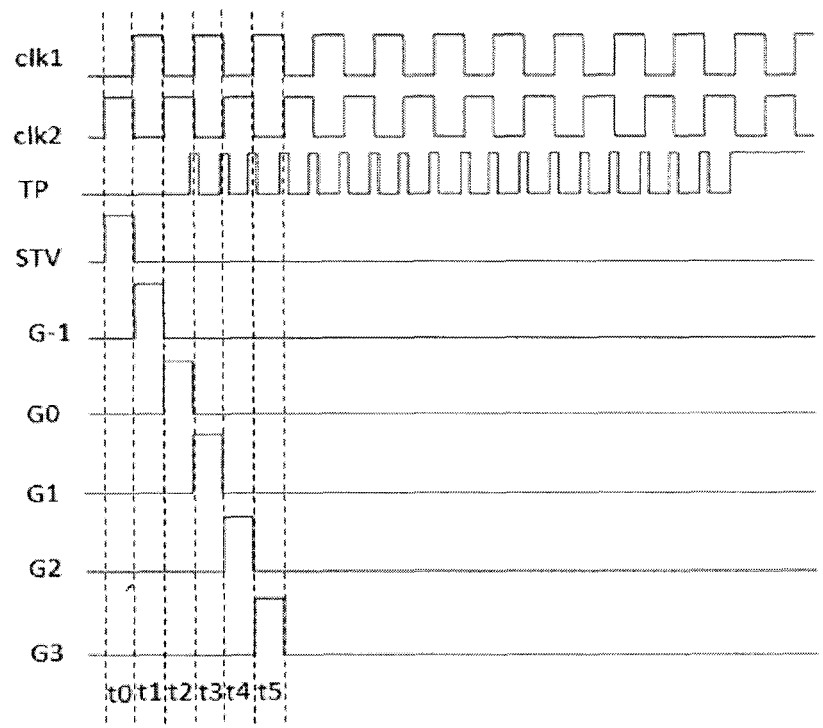
FIG. 3 shows a sequence diagram for driving the array substrate of FIG. 2, FIG. 4 schematically shows an array substrate according to a second embodiment of the present disclosure.

FIG. 3 shows a sequence diagram for driving the array substrate according to the present example. Clock signals clk1 and clk2 input pulse signal respectively to the odd-numbered scan lines and the even-numbered scan lines. TP is used for controlling the signal output of a data line. When TP is at low potential, the data line outputs a signal. When TP is at high potential, the output of signal on the data line is cut off STV is a line scanning trigger signal for controlling a scan line to send scan signal. G-1 to G3 are scan signals of corresponding scan lines.

The method for driving the array substrate according to the present example will be illustrated with reference to FIG. 3.

When the STV line scanning trigger signal is enabled, a drive pulse provides a plurality of scan lines on the array substrate with a sequence scanning signal. Firstly, a scan signal of the first auxiliary scan line G-1 enables the first TFT switches of pixel units corresponding to scan line G1. In this case, TP is at low potential and the voltage provided by the data line is a common electrode voltage. In this case, the voltage pre-charged into the pixel electrodes of the pixel units corresponding to scan line G1 is the common electrode voltage. Similarly, a scan signal of the second auxiliary scan line G0 enables the first TFT switches of pixel units corresponding to scan line G2, and the common electrode voltage provided by the data line pre-charges the pixel electrodes in the same line. Certainly, when the first auxiliary scan line G-1 and the second auxiliary scan line G0 respectively send out scan signals to enable the corresponding first TFT switches, the voltage provided by the data line can also be a preset voltage of other value.

When the scan signal of scan line G1 enables the second TFT switches of the pixel units in the same line and the first TFT switches of the pixel units corresponding to scan line G3, the voltage provided by the data line is the gray scale voltage needed by the pixel electrodes of the pixel units corresponding to scan line G1. In this case, the data line charges the pixel electrodes of the pixel units corresponding to scan line G1 with gray scale voltage, and pre-charges the pixel electrodes of the pixel units corresponding to scan line G3. Similarly, the same principle applies to G2, G3, and until the third scan line from the bottom of the array substrate. For the last two scan lines on the array substrate, since it is unnecessary for the scan signal to pass through branches divided from the two scan lines to enable the first TFT switches of the pixel units, the second TFT switches of the pixel units in corresponding lines can be enabled by scan signals of these two lines.

As compared with the array substrate in FIG. 1, the array substrate according to the present example can guarantee the aperture ratio and the charging efficiency, and at the same time reduce the production cost thereof. Of course, in order to improve the charging efficiency of a pixel electrode, the pre-charging method is not limited to that in the present example in which pixel electrodes in every other line of pixel units are pre-charged, as long as the each pixel electrode has the same voltage polarity when being pre-charged and when being charged with gray scale voltage.

Figure 4:
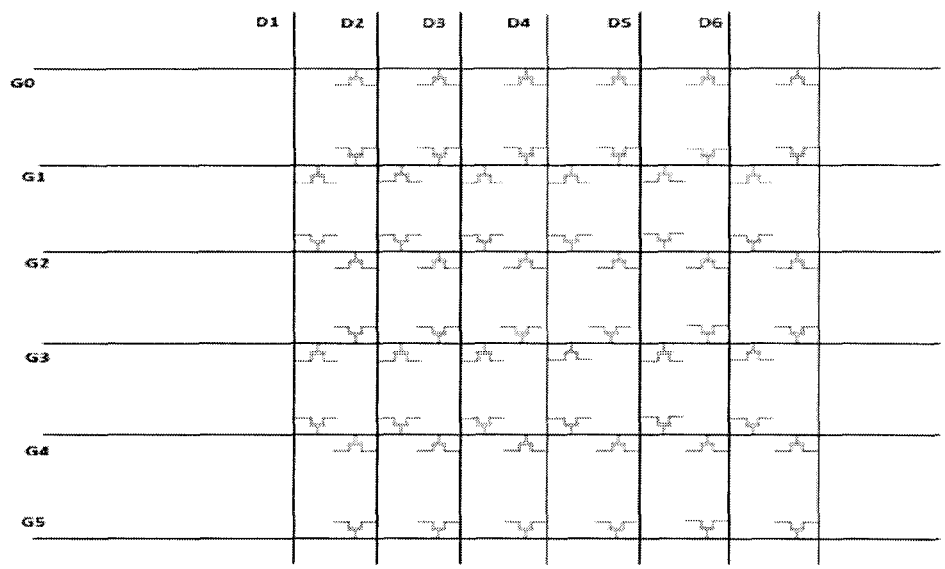

FIG. 4 schematically shows an array substrate according to example 2 of the present disclosure. As shown in the drawing, 3a is a first TFT switch, and 3b is a second TFT switch. D1 to D7 are data lines, and G0 to G5 are scan lines, in which G0 is an auxiliary scan line. The auxiliary scan line G0 is connected to the gates of the first TFT switches of pixel units in the first line on the array substrate. Under the action of a drive pulse, a scan signal of any one of scan lines G1 to G5 enables the second TFT switches of pixel units in a line, and at the same time enables the first TFT switches of pixel units in an adjacent line.

In the meantime, in the array substrate, the two TFTs in each of the pixel units in each column are driven by the same data line, but two adjacent pixel units in the same column are driven by different data lines. In this case, two adjacent data lines can control the pixel units in the same column.

Because the second TFT switches of pixel units in a former line of two adjacent lines are close to the first TFT switches in a latter line thereof, it is unnecessary for the scan signal to pass through a branch divided from a scan line to enable the first TFT switches of pixel units in different lines. In this case, the number of chips for driving the scan lines can be reduced, and at the same time the shading area of the scan lines on the array substrate can also be reduced, thereby the aperture ratio of the array substrate can be increased. Herein, "former" and "latter" indicate an ordering of the pixel units on the array substrate from an upper end of the array substrate to the lower end thereof.

Figure 5:
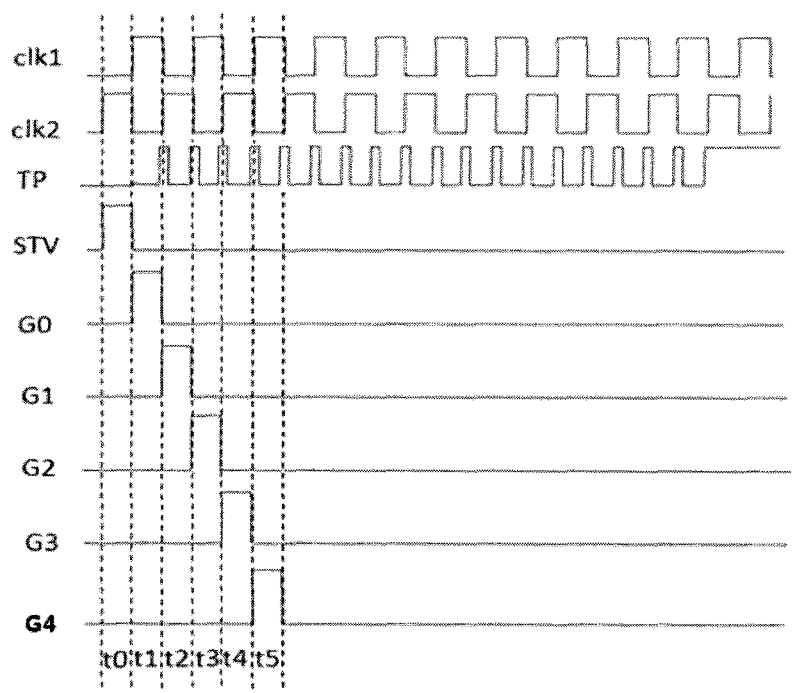
FIG. 5 shows a sequence diagram for driving the array substrate of FIG. 4, and FIG. 6 schematically shows a dot inversion of the pixel electrode.

The method for driving the array substrate according to the present example will be illustrated with reference to FIG. 5. The control signals in FIG. 5 respectively represent the same meaning as those in FIG. 3.

When the STV line scanning trigger signal is enabled, a drive pulse provides a plurality of scan lines on the array substrate with a sequence scanning signal. Firstly, a scan signal of the first auxiliary scan line G0 enables the first TFT switches of pixel units corresponding to scan line G1. In this case, TP is at low potential and the voltage provided by the data line is a common electrode voltage. In this case, the voltage pre-charged into the pixel electrodes of the pixel units corresponding to scan line G1 is the common electrode voltage. Certainly, when the auxiliary scan line G0 sends out scan signal to enable the first TFT switches corresponding to scan line G1, the voltage provided by the data line can also be a preset voltage of other value.

When the scan signal of scan line G1 enables the second TFT switches of the pixel units in the same line and the first TFT switches of the pixel units corresponding to scan line G2, the voltage provided by the data line is the gray scale voltage needed by the pixel electrodes of the pixel units corresponding to scan line G1. In this case, the voltage provided by the data line charges the pixel electrodes of the pixel units corresponding to scan line G1 with gray scale voltage, and pre-charge the pixel electrodes of the pixel units corresponding to scan line G2. Similarly, the same principle applies to G3, G4, and until the second scan line from the bottom of the array substrate. For the last scan line on the array substrate, since it is unnecessary for the scan signal to pass through a branch divided from the last scan line to enable the first TFT switches of the pixel units, the second TFT switches of the pixel units in the corresponding line can be enabled by the scan signal of this scan line.

As compared with the array substrate in FIG. 1, the array substrate according to this example can guarantee the charging efficiency, and at the same time reduce the cost for driving the scan lines. Because in the array substrate according to this example, scan lines are reduced, and it is unnecessary to divide branches of scan lines, and thus the aperture ratio of the array substrate can also be increased.

Figure 6:
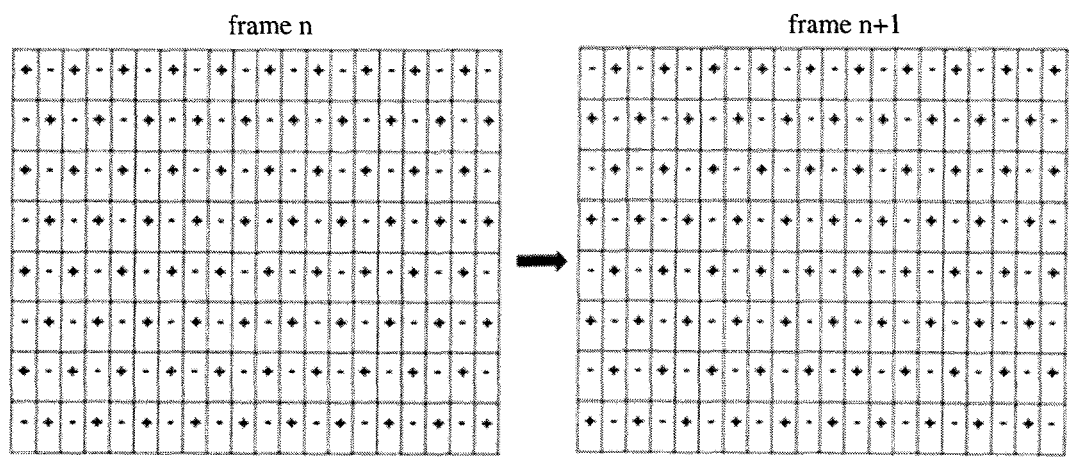

Currently, the polarity inversion of pixel electrodes within one frame of image on the array substrate include the following manners, such as frame inversion, line inversion, column inversion and dot inversion. As far as display effect is concerned, the dot inversion scheme can present the best picture quality. FIG. 6 schematically shows the dot inversion of the pixel electrode. As shown in the drawing, adjacent pixel electrodes in the same line and those in the same column respectively have opposite polarities; and pixel electrodes in every other lines and those in every other columns respectively have the same polarity. After the dot inversion, each of the pixel electrodes experiences a polarity inversion. Dot inversion can be realized through the cooperation between the scan lines and the data lines.

In realizing dot inversion as shown in FIG. 6, in example 1, a scan signal enables the first TFT switches on pixel units in lines that are spaced apart by one line of pixel units through a scan line and a branch divided from the scan line. In this case, the charging polarities of the pixel electrodes of pixel units in every other line can be the same. Therefore, each pixel electrode is charged twice with charging voltages having the same polarity, thereby the charging efficiency can be improved.

Certainly, in order to charge the pixel electrode twice with voltages having the same polarity, the branch divided from the scan line is connected to the gates of the first TFT switches of pixel units in a line that is spaced apart from said scan line by odd-numbered lines. In order to avoid RC delay effect caused by overlong signal transmission route, preferably, the branch divided from the scan line is connected to the gates of the first TFT switches of pixel units in a line that is spaced apart from said scan line by one line of pixel units.

In realizing dot inversion as shown in FIG. 6, in example 2, the scan signal of the scan line enables the first TFT switch and the second TFT switch respectively of two adjacent pixel units. The two TFT switches are controlled by different data lines. In the meantime, the two TFT switches of the same pixel unit are controlled by the same data line. In this case, the charging efficiency of each pixel electrode can be improved by controlling the charging polarities of the two TFTs in the same pixel unit to be the same.

The above embodiments are described only for better understanding, rather than restricting, the present disclosure. Any person skilled in the art can make amendments to the implementing forms or details without departing from the spirit and scope of the present disclosure. The scope of the present disclosure should still be subjected to the scope defined in the claims.

LIST OF REFERENCE SIGNS

1: scan line,
1a: auxiliary scan line,
2: data line,
3: TFT switch,
3a: first TFT switch, and
3b: second TFT switch.

The invention claimed is:

1. A liquid crystal display array substrate, comprising:
a plurality of scan lines formed on a substrate in parallel,
a plurality of data, lines, which are formed on the substrate in a direction perpendicular to the respective scan lines, but disposed in a different layer from the scan lines,
a plurality of pixel units respectively disposed in areas formed by the scan lines and the data lines, each pixel unit comprising at least one pixel electrode and at least two TFT switches, wherein a first TFT switch is used for pre-charging the pixel electrode, and a second TFT switch is used for charging the pixel electrode with gray scale voltage,
wherein a scan signal of at least one scan line enables the first TFT switches of the pixel units on in a line, and at the same time enables the second TFT switches of the pixel units one in another line,
wherein one of:
the sources of the first and second TFT switches of the pixel units in each column are connected to the same data line, and
the sources of the first and second TFT switches of two adjacent pixel units in the same column are respectively connected to two adjacent data lines.

2. The array substrate according to claim 1, wherein the pixel units in said another line are separated from the pixel units in said line by at least one line of pixel units.

3. The array substrate according to claim 1, wherein the pixel units in said another line are adjacent to the pixel units in said line.

4. The array substrate according to claim 2, wherein the scan lines further comprise two auxiliary scan lines respectively connected to the gates of the first TFT switches of the pixel units in the first two lines of the array substrate, so as to pre-charge the pixel units in these two lines.

5. The array substrate according to claim 3, wherein the scan lines further comprise an auxiliary scan line connected to the gates of the first TFT switches of the pixel units in the first line of the array substrate, so as to pre-charge the pixel units in the first line.

6. A method for driving the array substrate according to claim 1, comprising the following steps:
providing a sequence scanning signal to the plurality of scan lines of the array substrate under the action of a drive pulse,
providing a gray scale voltage signal to the plurality of data lines of the array substrate, so as to pre-charge the corresponding pixel electrodes or charge said pixel electrodes with gray scale voltage through the first TFT switches or the second TFT switches thereof,
wherein the scan signal on at the least one scan line enables the first TFT switches of the pixel units on in a line while enabling the second TFT switches of the pixel units on in another line, so as to charge the pixel units in said line with gray scale voltage while pre-charging the pixel units in said another line.

7. The method according to claim 6, wherein the scan lines further comprise two auxiliary scan lines, and when the scan signal of a first auxiliary scan line and that of a second auxiliary scan line respectively enable the first TFT switches of corresponding pixel units on, common electrode voltage signal is provided to the plurality of data lines.

8. The method according to claim 6, wherein the scan lines further comprise an auxiliary scan line, and when the scan signal of the auxiliary scan line enables the first TFT switches of corresponding pixel units on, common electrode voltage signal is provided to the plurality of data lines.

* * * * *